(12) United States Patent
Warshaw

(10) Patent No.: US 10,480,195 B2
(45) Date of Patent: Nov. 19, 2019

(54) TUBULAR STRUCTURE CONNECTING ASSEMBLY

(71) Applicant: 9220-6820 Quebec Inc., Montreal West (CA)

(72) Inventor: William Kell Warshaw, Montreal West (CA)

(73) Assignee: 9220-6820 QUEBEC INC., Montreal West, Quebec (CA)

( * ) Notice: Subject to any disclaimer, the term of this patent is extended or adjusted under 35 U.S.C. 154(b) by 1087 days.

(21) Appl. No.: 14/639,783

(22) Filed: Mar. 5, 2015

(65) Prior Publication Data

US 2015/0252569 A1    Sep. 10, 2015

Related U.S. Application Data

(60) Provisional application No. 61/948,403, filed on Mar. 5, 2014.

(51) Int. Cl.
*E04F 11/18*    (2006.01)

(52) U.S. Cl.
CPC ........ *E04F 11/184* (2013.01); *E04F 11/1834* (2013.01); *Y10T 403/42* (2015.01)

(58) Field of Classification Search
CPC .............. E04F 11/1802; E04F 11/1808; E04F 11/1817; E04F 11/1834; E04F 11/184; E04F 11/1836; F16B 12/40; F16B 12/44; F16B 12/48; F16B 12/50; F16L 27/02; F16L 27/042; F16L 27/0837;

(Continued)

(56) References Cited

U.S. PATENT DOCUMENTS 173,169 A * 2/1876 Henis .................. F16L 27/0849
                                                   285/184
704,936 A    7/1902 Scherer
(Continued)

FOREIGN PATENT DOCUMENTS

DE          4308967 A1 *  9/1994    .......... E04F 11/1817
DE         19741819 A1 *  3/1999    ............ F16L 41/007
(Continued)

*Primary Examiner* — Amber R Anderson
*Assistant Examiner* — Nahid Amiri
(74) *Attorney, Agent, or Firm* — Michael D. Downs; Fincham Downs LLC

(57) ABSTRACT

A connecting assembly for connecting two angled tubular structures, comprising: a male section comprising a curved tubular element extending between a first beveled end and a second beveled end, a connecting flange extending linearly and outwardly from the first beveled end and comprising a connection lip extending radially and outwardly therefrom, the second beveled end being rotatably connectable to a first angled tubular structure; and a connector rotatably connectable to the connecting flange of the male section and comprising a linear tubular element between a first connecting end and a second connecting end and a connection means secured to the first connecting end of the linear tubular element and connectable to a second angled tubular structure, the linear tubular element comprising a lip receiving recess located on an internal face thereof and adapted to receive the connecting lip when the male section is inserted into the connector.

19 Claims, 17 Drawing Sheets

(58) Field of Classification Search
CPC . F16L 27/0845; F16L 27/0849; F16L 41/007; F16L 41/18; F16L 43/00; Y10T 403/42
USPC .............................. 403/205; 256/65.15, 67
See application file for complete search history.

(56) References Cited

U.S. PATENT DOCUMENTS

| | | | | |
|---|---|---|---|---|
| 1,678,350 A * | 7/1928 | Ott | ................. | F16B 7/0413 256/65.15 |
| 1,965,644 A * | 7/1934 | Heffelfinger | ........... | A61G 1/003 160/377 |
| 2,066,227 A * | 12/1936 | Reukauf, Jr. | ........... | E04F 10/02 160/81 |
| 2,342,425 A * | 2/1944 | Parker | ................. | F16L 41/007 285/119 |
| 2,374,815 A * | 5/1945 | Haas, Jr. | ................. | F16L 41/02 138/161 |
| 2,413,878 A * | 1/1947 | Maky | ................. | F16L 41/007 138/109 |
| 2,594,580 A * | 4/1952 | Paul | ................. | A61G 17/04 27/10 |
| 2,907,590 A * | 10/1959 | Oswald | ................. | F16L 27/0816 277/500 |
| 2,995,392 A * | 8/1961 | Kruse | ................. | F16B 7/0446 285/179 |
| 3,076,667 A * | 2/1963 | Klingler | ................. | F16L 17/073 285/147.1 |
| 3,145,035 A * | 8/1964 | Hanback | ................. | F16L 17/063 285/110 |
| 3,845,975 A * | 11/1974 | Van Heijst | ................. | F16L 27/02 285/283 |
| 3,851,980 A * | 12/1974 | Worth | ................. | F16B 7/0446 108/159 |
| 3,932,048 A * | 1/1976 | DuPont | ................. | F16B 12/40 403/225 |
| 4,557,467 A | 12/1985 | Lin | | |
| 4,627,646 A | 12/1986 | Kessel | | |
| 4,637,589 A | 1/1987 | Lin | | |
| 4,864,795 A * | 9/1989 | Burg | ................. | F16B 7/04 403/174 |
| 4,915,533 A | 4/1990 | de la Haye | | |
| 5,156,420 A | 10/1992 | Bokor et al. | | |
| 5,193,786 A * | 3/1993 | Guenther | ................. | E04F 11/18 256/59 |
| 5,273,258 A * | 12/1993 | Bedics | ................. | E04F 19/026 248/345.1 |
| 5,328,213 A | 7/1994 | Barth | | |
| 5,348,414 A | 9/1994 | Dziuk et al. | | |
| 5,640,811 A * | 6/1997 | Boyle | ................. | E04H 4/108 135/142 |
| 5,765,812 A * | 6/1998 | Guenther | ................. | E04F 11/1804 256/65.15 |
| 6,257,799 B1* | 7/2001 | Ribe | ................. | E04F 11/1834 256/65.15 |
| 6,386,518 B1* | 5/2002 | Shreiner | ................. | E04F 11/1804 256/65.01 |
| 6,533,251 B1 | 3/2003 | Abbaticchio | | |
| 6,568,658 B2* | 5/2003 | Strome | ................. | E04F 11/1812 256/59 |
| 7,970,276 B1 | 6/2011 | Routhier | | |
| 8,172,477 B2* | 5/2012 | Damsi | ................. | B60J 7/062 403/205 |
| 8,356,802 B2 | 1/2013 | Reich | | |
| 8,517,162 B2 | 8/2013 | Khairallah et al. | | |
| D707,366 S * | 6/2014 | Rowland | ................. | D25/38.1 |
| D731,880 S * | 6/2015 | Thrush | ................. | D8/382 |
| 2008/0277640 A1 | 11/2008 | Striebel et al. | | |
| 2009/0273180 A1* | 11/2009 | Lavalle | ................. | F16L 25/08 285/10 |
| 2010/0148488 A1* | 6/2010 | Homola | ................. | F16L 25/14 285/12 |
| 2010/0171303 A1 | 7/2010 | Krausz et al. | | |
| 2014/0231444 A1 | 8/2014 | Molfetta | | |
| 2015/0259926 A1* | 9/2015 | Chang | ................. | E04F 11/1836 256/65.01 |

FOREIGN PATENT DOCUMENTS

| | | | |
|---|---|---|---|
| DE | 19810106 A1 * | 9/1999 | ............... F16L 7/00 |
| DE | 10153435 A1 * | 5/2003 | ............ E04F 11/181 |
| EP | 0688920 | 12/1998 | |
| EP | 0884433 | 10/2002 | |
| EP | 1528180 | 5/2005 | |

* cited by examiner

TUBULAR STRUCTURE CONNECTING ASSEMBLY

CROSS-REFERENCE TO RELATED APPLICATIONS

This application claims priority of U.S. Provisional patent application having Ser. No. 61/948,403, which was filed on Mar. 5, 2014 and is entitled "Handrail joint assembly", the specification of which is hereby incorporated by reference.

TECHNICAL FIELD

The present invention relates to the field of handrails, and more particularly to connectors for connecting together angled handrail sections.

BACKGROUND

Continuous railings and/or handrails that transition from sloping to horizontal and/or that follow angle changes between walls are desirable for appearance, safety, and/or regulatory compliance. Moreover, continuous railings or handrails are helpful for seniors or people with walking difficulties.

Railing portions bent at fixed angles are used in some cases to connect two straight railing portions. However, these types of railings are typically bent at one of a limited number of standard angles, and are therefore not suitable to connect two straight railing portions which are angled relative to each other at a non-standard angle or when angle and inclination changes occur simultaneously, as in cases of winding staircases and ramps.

In other instances, adjustable elbow joints are used to join two straight railing portions, but they create abrupt angle changes and typically feature exposed pivots, making them unsuitable and unattractive wherever a smooth transition or finished appearance is required.

A current method of providing continuous handrail surfaces in these instances consists in using custom-fabricated wooden bends or custom bent and welded metal joints. Unfortunately, both means are expensive and time-consuming and, in the case of the wooden railing, may not provide sufficient durability or vandal-resistance.

Therefore, there is a need for an improved connecting assembly for connecting angled tubular structures such as angled handrail sections.

SUMMARY

There is described a connecting assembly for connecting two angled tubular structures, i.e. two tubular structures that meet end to end at an angle and/or inclination. In one embodiment, the connecting assembly may be installed without any special tools and without cutting, bending, welding, and/or the like. In an embodiment in which the two tubular structures comprise two angled handrail sections, once the handrail connecting assembly installed, the resulting handrail is continuous over any angle with a smooth and unbroken transition.

According to a broad aspect, there is provided a connecting assembly for connecting two angled tubular structures together, comprising: a male section comprising a male curved tubular element extending along a male curved axis between a first beveled end and a second beveled end, a male connecting flange extending linearly and outwardly from the first beveled end and comprising a male connection lip extending radially and outwardly therefrom, the second beveled end being connectable to a first one of the two angled tubular structures; and a connector rotatably connectable to the male connecting flange of the male section and comprising a linear tubular element extending along a linear axis between a first connecting end and a second connecting end and a connection means secured to the first connecting end of the linear tubular element and connectable to a second one of the two angled tubular structures, the linear tubular element comprising a lip receiving recess located on an internal face thereof and adapted to receive the male connecting lip when the male connecting flange of the male section is inserted into the connector.

In one embodiment, the connection means comprises a hemi-tubular plate extending linearly and outwardly from the first connecting end of the linear tubular element, the hemi-tubular plate being adapted for insertion into a cavity located at a given end of the second one of the two angled tubular structures.

In one embodiment, the hemi-tubular plate comprises a screw receiving hole for attachment to the second one of the two angled tubular structures.

In one embodiment, the linear tubular element comprises a first linear hemi-tubular element and a second linear hemi-tubular element connectable together to form the linear tubular element.

In one embodiment, the connection means comprises a hemi-tubular plate extending linearly and outwardly from the first linear hemi-tubular element, the hemi-tubular plate being adapted for insertion into a cavity located at a given end of the second one of the two angled tubular structures.

In one embodiment, the second linear hemi-tubular element comprises a pair of brackets and the hemi-tubular plate of the first second linear hemi-tubular element comprises a pair of hooks for engaging the pair of brackets and thereby securing the first and second linear hemi-tubular elements together.

In one embodiment, the male section further comprises an additional male connecting flange extending linearly and outwardly from the second beveled end and comprising an additional male connection lip extending radially and outwardly therefrom.

In one embodiment, the connecting assembly further comprises a female section rotatably connectable to the additional male connecting flange of the male section and comprising a female curved tubular element extending along a female curved axis between a third beveled end and a fourth beveled end, the second curved tubular element comprising a lip receiving recess located on an internal face thereof adjacent the third beveled end and adapted to receive the additional male connecting lip when the additional male connecting flange of the male section is inserted into the female section, the fourth beveled end being connectable to the first one of the two angled tubular structures.

In one embodiment, the female curved tubular element comprises a first curved hemi-tubular element and a second curved hemi-tubular element connectable together to form the second curved tubular element.

In one embodiment, the two angled tubular structures comprises one of: two angled handrail sections, two angled safety railing sections, two angled grab bar sections, two angled footrest sections, and two angled curtain rod sections.

According to another broad aspect, there is provided a connecting assembly for connecting two angled tubular structures together, comprising: a male section comprising a male curved tubular element extending along a male curved axis between a first beveled end and a second beveled end, a male connecting flange extending linearly and outwardly from the first beveled end and a male connection lip extending radially and outwardly from the male connecting flange, the second beveled end being connectable to a first one of the two angled tubular structures; and a female section rotatably connectable to the male connecting flange of the male section and comprising a female curved tubular element extending along a male curved axis between a third beveled end and a fourth beveled end, the female curved tubular element comprising a lip receiving recess located on an internal face of the female curved tubular element adjacent the third beveled end, the lip receiving recess for receiving the male connecting lip when the male connecting flange of the male section is inserted into the female section, the fourth beveled end of the female section being connectable to a second one of the two angled tubular structures.

In one embodiment, the female section is rotatably connectable to the second one of the two angled tubular structures. In another embodiment, the female section is fixedly securable to the second one of the two angled tubular structures.

In one embodiment, the female curved tubular element comprises a first curved hemi-tubular element and a second curved hemi-tubular element connectable together to form the female curved tubular element.

In one embodiment, the connecting assembly further comprises a first screw receiver extending from a first internal face of the first curved hemi-tubular element and a second screw receiver extending from a second internal face of the second curved hemi-tubular element, the first and second screw receivers forming a screw receiving hole when the first and second curved hemi-tubular elements are connected together.

In one embodiment, the connecting assembly further comprises at least one pin extending from the first internal face of the first curved hemi-tubular element and at least one corresponding socket extending from the second internal face of the second curved hemi-tubular element, the at least one pin being insertable into the at least one corresponding socket when the first and second curved hemi-tubular elements are connected together.

In one embodiment, the connecting assembly further comprises a rail extending along a longitudinal end of the first curved hemi-tubular element, the second curved hemi-tubular element comprising an indentation extending along a longitudinal end thereof, the rail being insertable into the indentation when the first and second curved hemi-tubular elements are connected together.

In one embodiment, the female section further comprises a female connecting flange extending linearly and outwardly from the fourth beveled end and a female connection lip extending radially and outwardly from the female connecting flange, the female connecting flange being connectable to the second one of the two angled tubular structures.

In one embodiment, the connecting assembly further comprises a connector rotatably connectable to female connector and connectable to the second one of the two angled tubular structures, the connector comprising a linear tubular element extending along a linear axis between a first connecting end and a second connecting end and a connection means secured to the first connecting end of the linear tubular element and connectable to a second one of the two angled tubular structures, the linear tubular element comprising a connection recess located on an internal face thereof adjacent the second connecting end and adapted to receive the female connecting lip when the female connecting flange of the female section is inserted into the connector.

In one embodiment, the connection means comprises a hemi-tubular plate extending linearly and outwardly from the first connecting end of the linear tubular element, the hemi-tubular plate being adapted for insertion into a cavity located at a given end of the second one of the two angled tubular structures.

In one embodiment, the hemi-tubular plate comprises a screw receiving hole for attachment to the second one of the two angled tubular structures.

In one embodiment, the connecting assembly provides a smooth, safe and uninterrupted transition between two angled tubular structures. The connecting assembly is further easy to install, inexpensive to manufacture and presents a curvature that can be changed to adapt to tubular structures forming different angles.

In one embodiment, the connecting assembly is a handrail connecting assembly adapted to connect together two angled handrails or handrail sections.

In another embodiment, the connecting assembly is adapted to connect together two angled safety railings or railing sections.

In a further embodiment, the connecting assembly is adapted to connect together two angled grab bars or grab bar sections.

In still another embodiment, the connecting assembly is adapted to connect together two angled footrests or footrest sections.

In still a further embodiment, the connecting assembly is adapted to connect together two angled curtain rods or curtain rod sections.

While in the present description, there is described a handrail connecting assembly for connecting together handrails, it should be understood that the handrail connecting assembly may also be used for connecting railings.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
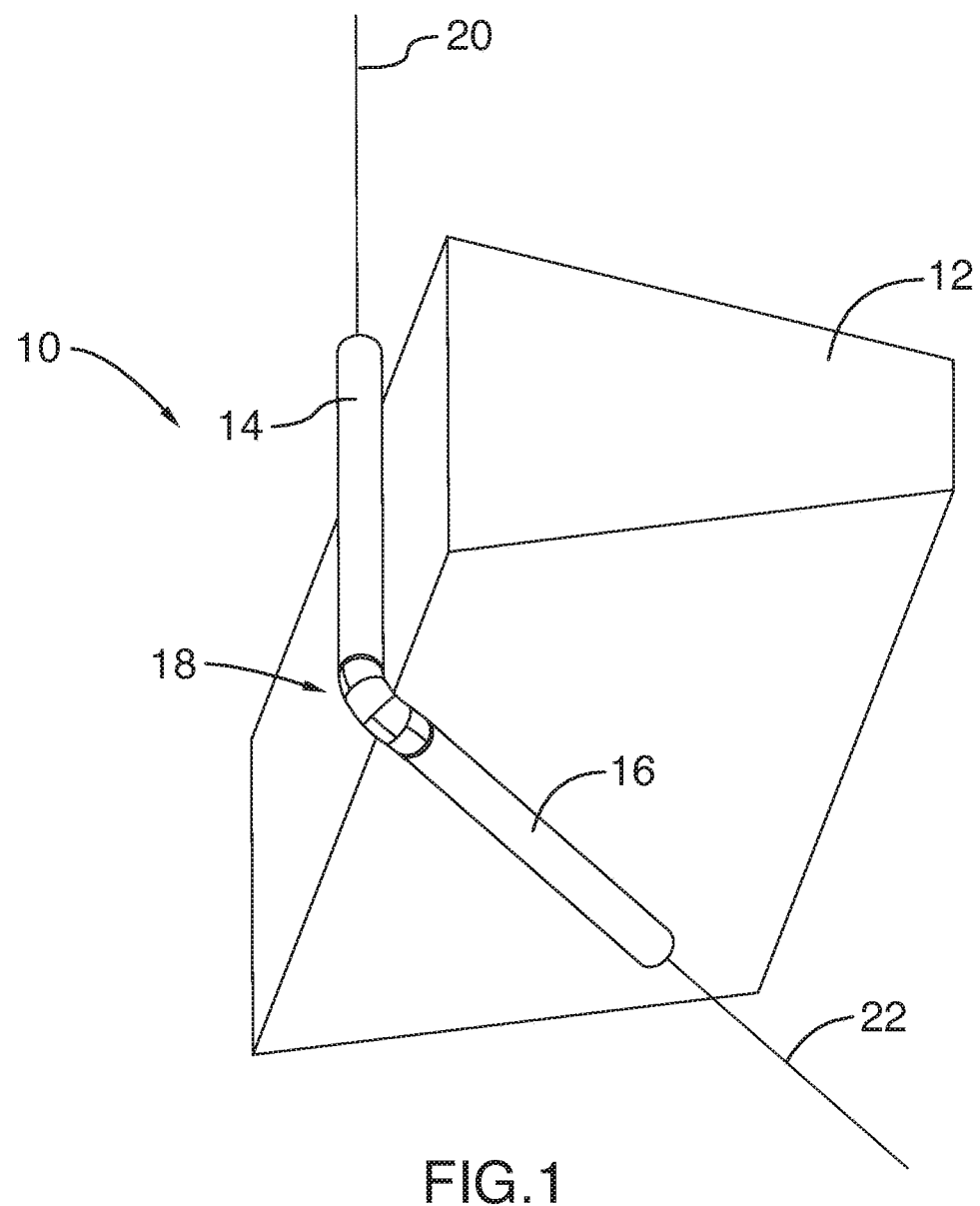
FIG. 1 illustrates a handrail secured to an angle wall, the handrail comprising an angled or bend handrail connecting assembly, in accordance with an embodiment.

FIG. 1 illustrates one embodiment of a handrail assembly 10 secured to an angled wall 12. The wall 12 forms an acute angle and the handrail assembly 10 is curved so as to substantially follow the acute angle of the wall 12.

The handrail assembly 10 comprises two handrail sections 14 and 16 connected together via a handrail connecting assembly 18. The handrail section 14, 16 has a cylindrical or tubular shape and extends along a linear longitudinal axis 20, 22. The handrail sections 14 and 16 are each fixedly secured at a respective end of the handrail connector 18. The handrail sections 14 and 16 are further secured to the wall 12. The person skilled in the art will understand that any adequate securing means (not shown in FIG. 1) for securing the handrail sections 14 and 16 to the wall 12 may be used.

The handrail connecting assembly 18 has a curved cylindrical or tubular shape, i.e. it extends along a curved longitudinal axis. As further described below, the handrail connecting assembly 18 has a modular shape which allows changing the curvature of the handrail connecting assembly 18 in order to adapt to different angled walls for example.

In the illustrated embodiment, the longitudinal axes 20 and 22 of the handrail sections 14 and 16 are coplanar, i.e. the longitudinal axes 20 and 22 extends within a same plane, and the curved longitudinal axis of the handrail connecting assembly 18 also extends within the plane which contains the longitudinal axes 20 and 22. In another embodiment, the longitudinal axes 20 and 22 of the handrail sections 14 and 16 may be contained in different planes that intersect each other. The configuration of the handrail connecting assembly 18 is then modified and adjusted so that it may connect the handrail sections 14 and 16 together.

Figure 2:
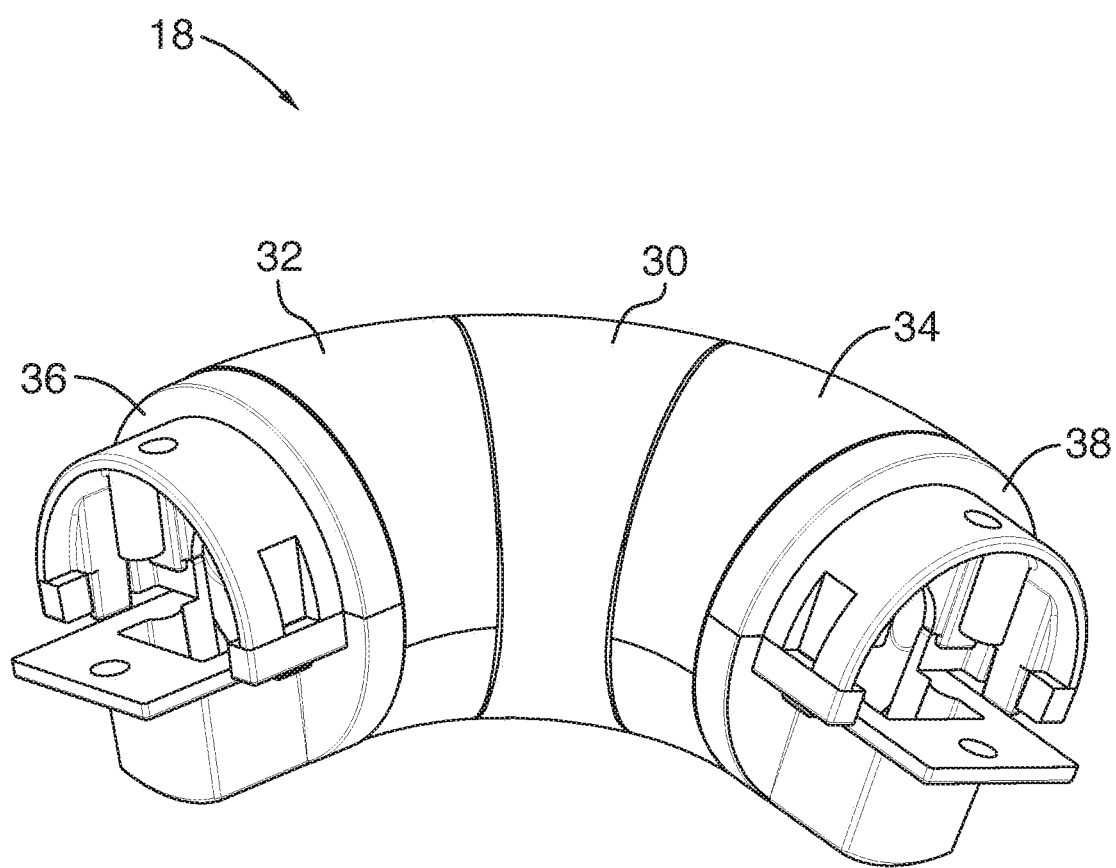
FIG. 2 is a front perspective view of a handrail connecting assembly having a 45 degree curvature and comprising a male section, two female sections, and two connectors, in accordance with an embodiment.

In the embodiment illustrated in FIG. 2, the handrail connecting assembly 18 comprises five elements, i.e. a central male section 30, two female sections 32 and 34 each rotatably secured at a respective end of the male section 30, and two connectors 36 and 38 each rotatably secured to a respective female section 32, 34. Each connector 36, 38 is adapted to be fixedly secured to a respective handrail section 14, 16. In the illustrated embodiment, the curvature of handrail connecting assembly 18 which corresponds to the curvature of the curved longitudinal axis along which the handrail connecting assembly 18 extends is about 45 degrees. The curvature of the handrail connecting assembly 18 further corresponds to the angle between a first axis that is orthogonal to a first end of the handrail connecting assembly and a second axis that is orthogonal to a second end of the handrail connecting assembly 18. As further described below, the curvature of the handrail connecting assembly 18 may be adjusted by rotating the central male section 30 relative to at least one of the female sections 32 and 34, or vice-versa.

Figure 3:
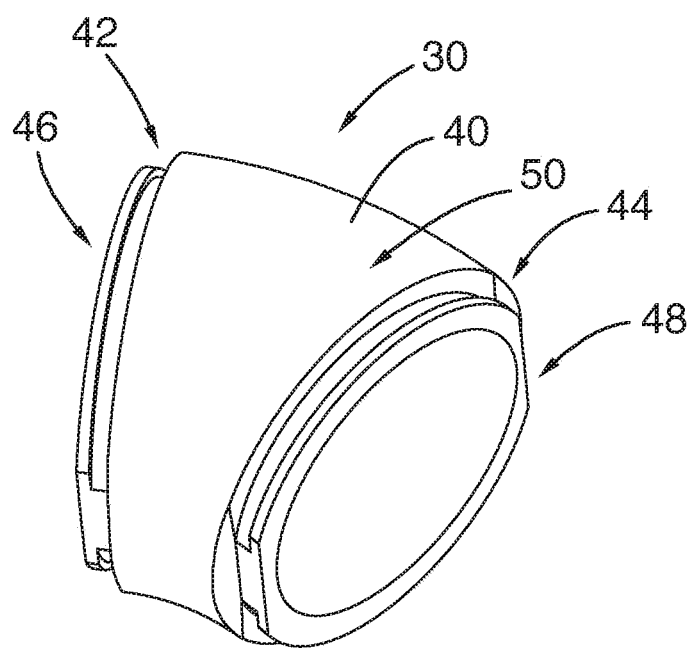
FIG. 3 is a perspective view of the male section of FIG. 2, in accordance with an embodiment.
Figure 4:
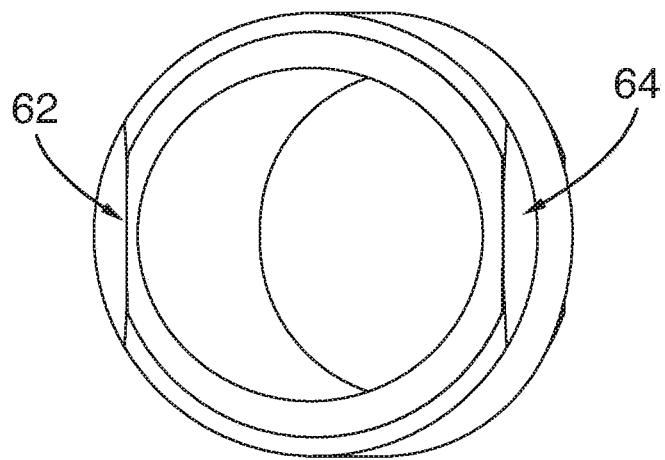
FIG. 4 is a side view of the male section of FIG. 3.
Figure 5:
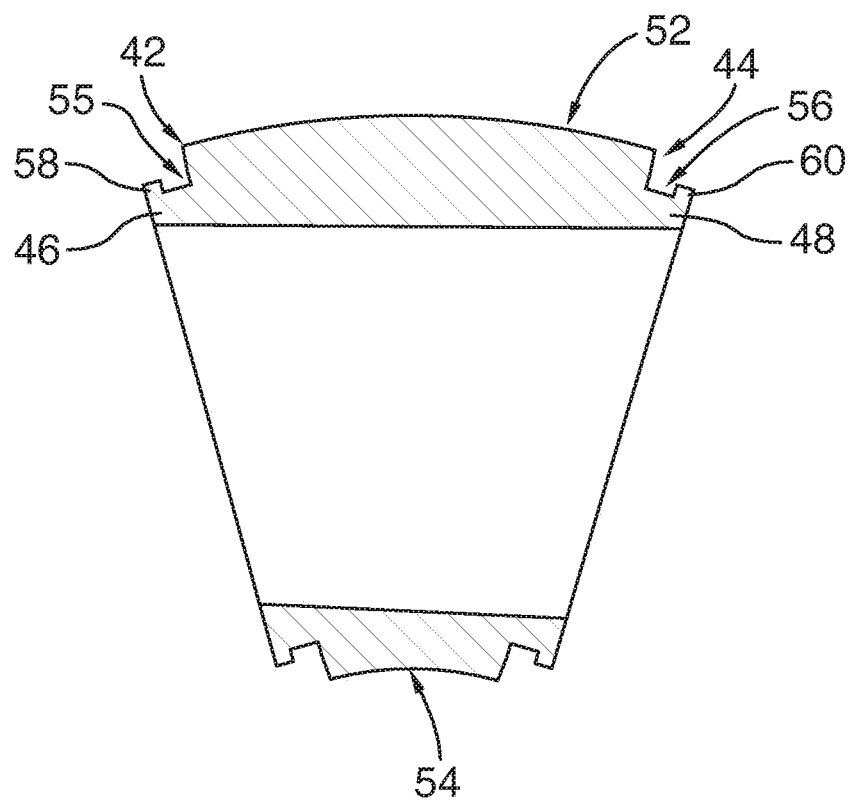
FIG. 5 is a cross-sectional view of the male section of FIG. 3.

FIGS. 3-5 illustrate one embodiment of a central male section 30. The central male section 30 has a substantially tubular shape presenting a substantially circular cross-section, and extends along a curved longitudinal axis. The central male section 30 comprises a curved and beveled tubular element 40 that extends between a first end 42 and a second end 44 along a curved longitudinal axis, and two connecting or male flanges 46 and 48 secured at the first end 42 and the second end 44 of the tubular element 40, respectively.

The tubular element 40 is formed of a curved tube which extends along the curved longitudinal axis between the ends 42 and 44 which are both beveled. As a result of the beveled ends 42 and 44, the length of the tubular element 40 between the ends 42 and 44 varies along the direction orthogonal to the curved longitudinal axis, as illustrated in FIG. 5. As also illustrated in FIG. 5, the curvature of the external face 50 of the tubular element 40 varies along the direction orthogonal to the curved longitudinal axis. The portion 52 of the external face 50 that corresponds to the maximal length for the tubular element 40 presents a convex curvature and the corresponding curvature is minimal, i.e. the curvature radius is maximal. The portion 54 of the external face 50 that corresponds to the minimal width for the tubular element 40 presents a concave curvature and the corresponding curvature is maximal, i.e. the curvature radius is minimal. The curvature of the external face 50 then varies from a convex curvature to a concave curvature therealong, and also varies from the maximal curvature value to the minimal curvature value.

As illustrated in FIGS. 3 and 5, the first connecting flange 46 protrudes substantially perpendicularly and linearly from the tubular element 40 at the beveled end 42 while the second connecting flange 48 protrudes substantially perpendicularly and linearly from the beveled end 44. Each connecting flange 46, 48 has a tubular or ring shape extending along a respective linear axis. For each connecting flange 46, 48, the external diameter varies therealong so as to create a recess or groove portion 55, 56 positioned between the tubular element 40 and a raised lip or rim 58, 60. It should be noted that the external diameter of the recess portion 55, 56 is less than the external diameter of the lip 58, 60 and that the external diameter of the lip 58, 60 is less than that of the tubular element 40.

As illustrated in FIGS. 3 and 4, each connecting flange 46, 48 has a truncated annular cross-sectional shape. A first truncation 62 is located adjacent the portion of the tubular element 40 having the minimal width and a second truncation 64 is located adjacent the portion of the tubular element 40 having the maximal width.

In one embodiment, the truncations 62 and 64 may be omitted.

While in the illustrated embodiment it has a curved tubular shape and it is hollow, it should be understood that the central male section 30 may have other shape such as a curved cylindrical shape. For example, while it is hollow, the tubular element 40 may be solid to form a curved cylindrical element.

Figure 6:
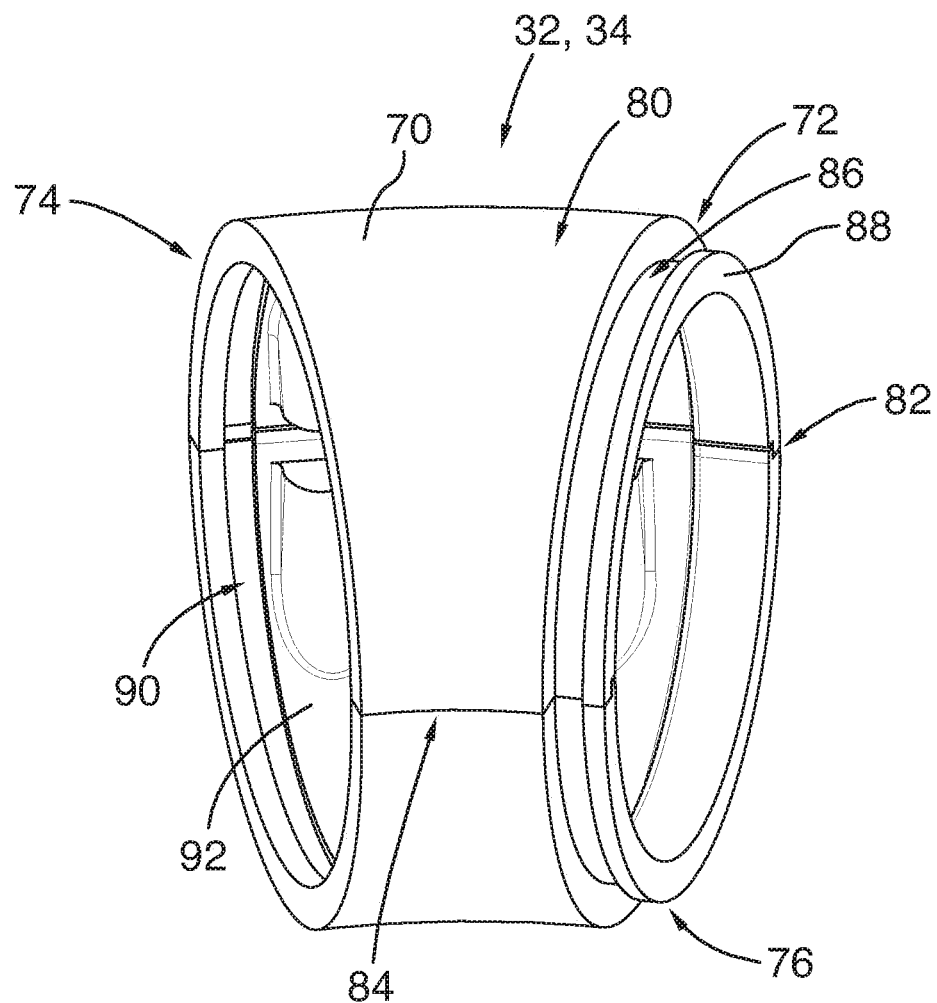
FIG. 6 is a perspective view of a female section of FIG. 2, in accordance with an embodiment.

FIGS. 6-9 illustrates one embodiment of a female section 32, 34. As illustrated in FIG. 6, the female section 32, 34 has a substantially curved tubular shape and extends along a curved longitudinal axis. The female section 32, 34 comprises a curved and beveled tubular element 70 that extends between a first end 72 and a second end 74 along the curved longitudinal axis and a connecting flange 76 secured at the first end 72 of the tubular element 70.

The tubular element 70 is formed of a curved tube which extends along the curved longitudinal axis between the ends 72 and 74 which are both beveled. As a result of the beveled ends 72 and 74, the length of the tubular section 70 between the ends 72 and 74 varies along the direction orthogonal to the curved longitudinal axis. As illustrated in FIG. 6, the curvature of the external face 80 of the tubular element 70 varies along the direction orthogonal to the curved longitudinal axis. The portion 82 of the external face 80 that corresponds to the maximal length for the tubular element 70 presents a convex curvature and the corresponding curvature is minimal, i.e. the curvature radius is maximal. The portion 84 of the external face 80 that corresponds to the minimal length for the tubular element 70 presents a concave curvature and the corresponding curvature is maximal, i.e. the curvature radius is minimal. The curvature of the external face 80 then varies from a convex curvature to a concave curvature therealong, and also varies from the maximal curvature value to the minimal curvature value.

As illustrated in FIG. 6, the connecting flange 72 protrudes substantially perpendicularly and linearly from the tubular element 70 at the beveled end 72. The connecting flange 72 has a tubular shape extending along a linear axis. The external diameter of the connecting flange 76 varies along the curved longitudinal axis so as to create a recess portion 86 positioned between the tubular element 70 and a lip or rim 88. It should be noted that the external diameter of the recess portion 86 is less than the external diameter of the lip 88 and the external diameter of the lip 88 is less than that of the tubular element 70.

The tubular element 70 further comprises a recess or a groove 90 located on the internal face 92 of the tubular element 70 adjacent the second end 74. The recess 90 has an annular shape and its characteristics are chosen as a function of the characteristics of the connecting flange 46, 48 so that the lip 58, 60 be received in the recess 90 when the connecting flange 46, 48 of the central male section 30 is inserted into the female section 32, 34. For example, the distance between the recess 90 and the second end 74 of the tubular element 70 may be chosen to be substantially equal to the length of the recess 55, 56 of the connecting flange 46, 48 of the central male section 30. In another example, the internal diameter of the recess 90 of the female section 32, 34 is chosen to be substantially equal to the external diameter of the lip 58, 60 of the central male section 30. In one embodiment, the characteristics of the connecting flange 46, 48 are chosen so that the central male section 30 be snuggingly received in the female section 32, 34 when they are connected together.

Figure 7:
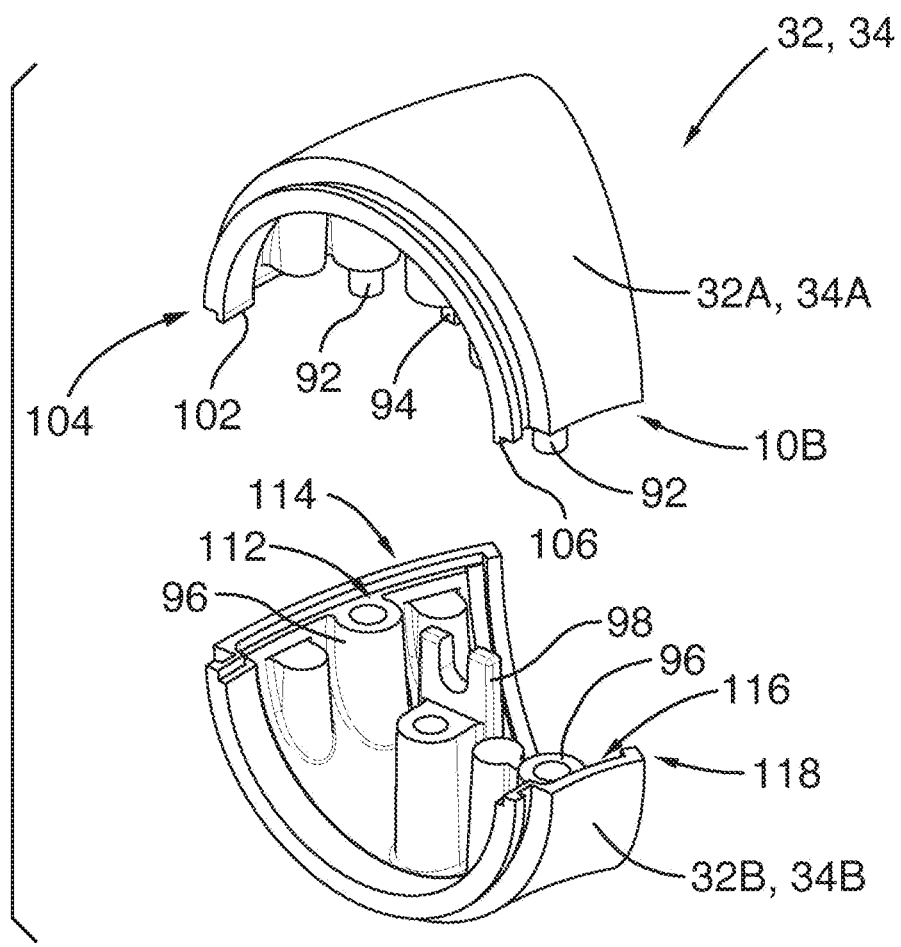
FIG. 7 is a perspective of two hemi-tubular elements forming the female section of FIG. 6 when assembled together, in accordance with an embodiment.

In one embodiment and as illustrated in FIG. 7, the female section 32, 34 is made of two hemi-tubular portions 32A, 34A and 32B, 34B which form the female section 32, 34 when they are assembled together.

Figure 8:
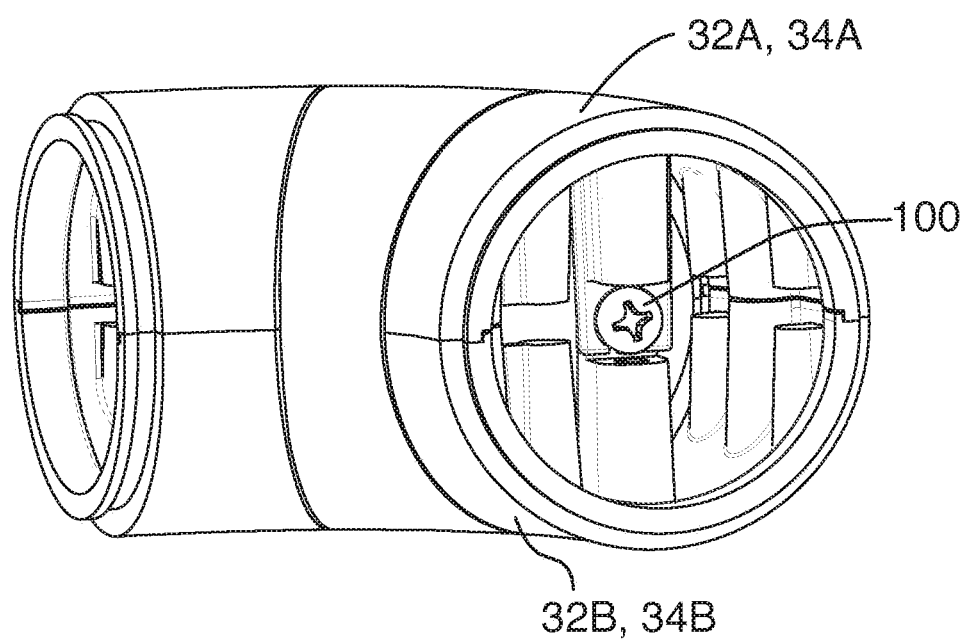
FIG. 8 is a perspective view of the handrail connecting assembly of FIG. 2 without the two connectors, in accordance with an embodiment.
Figure 9:
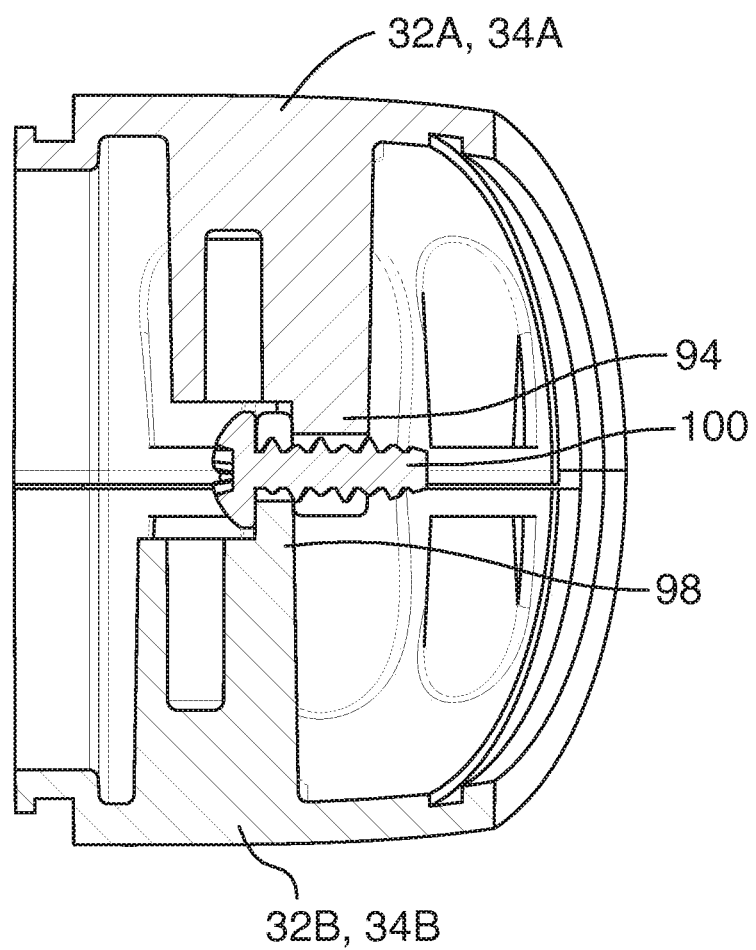
FIG. 9 is a cross-sectional view of the two hemi-tubular elements secured together by a screw, in accordance with an embodiment.

The hemi-tubular portion 32A, 34A comprises a plurality of pins 92 and a screw receiver 94 which each extend from the internal face of hemi-tubular portion 32A, 34A. The hemi-tubular portion 32B, 34B comprises a plurality of sockets 96 and a screw receiver 98 which each extend from the internal face of the hemi-tubular portion 32B, 34B. Each socket 96 is positioned, shaped and sized to receive a respective pin 92 when the hemi-tubular portions 32A, 34A and 32B, 34B are secured together. When the hemi-tubular portions 32A, 34A and 32B, 34B are secured together, the screw receivers 94 and 98 form a slotted hole adapted to receive a securing means such as a screw 100 as illustrated in FIGS. 8 and 9.

In one embodiment and referring back to FIG. 7, the hemi-tubular portion 32A, 34A comprises a first rail 102 that protrudes from and extends along a first longitudinal end 104, and a second rail 106 that protrudes from and extends along a second longitudinal end 108. The hemi-tubular portion 32B, 34B comprises a first indentation 112 that extends along a first longitudinal end 114 thereof, and a second indentation 116 that extends along a second end 118 thereof. When the hemi-tubular sections 32A, 34A and 32B, 34B are secured together, the rails 102 and 104 are received within the indentations 112 and 114, respectively.

While the present description refers to pins 92, sockets 96, screw receivers 94 and 98, and a screw 100 for securing together the hemi-tubular portions 32A, 34A and 32B, 34B, it should be understood that any adequate securing means may be used. For example, the hemi-tubular portions 32A, 34A and 32B, 34B may be secured together using an adhesive.

Figure 10:
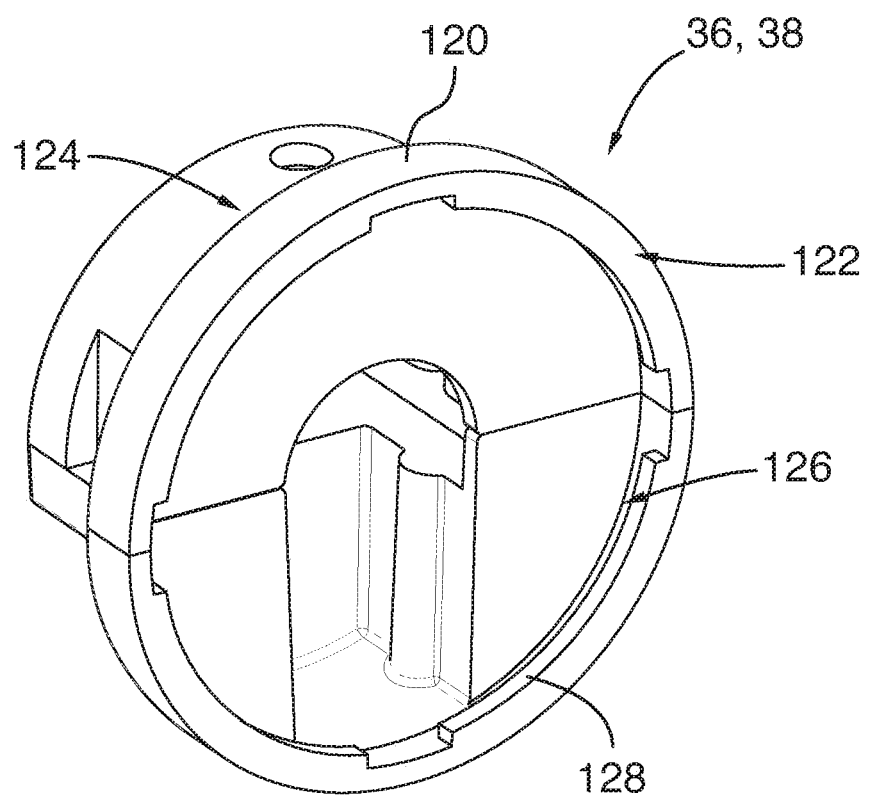
FIG. 10 is a back perspective view of a connector of FIG. 2, in accordance with an embodiment.
Figure 11:
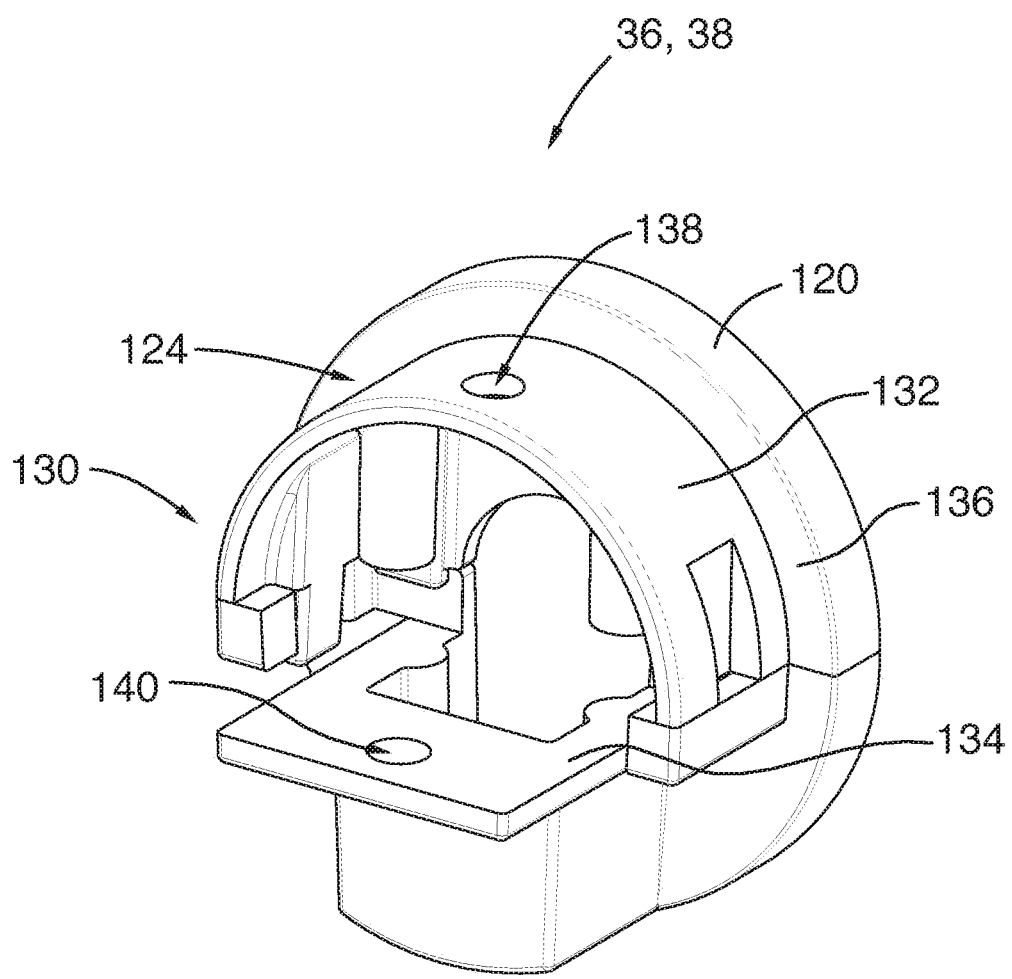
FIG. 11 is a front perspective view of the connector of FIG. 10.

FIGS. 10 and 11 illustrate one embodiment of a connector 36, 38 for securing the handrail connecting assembly 18 to a handrail section 14, 16. The connector 36, 38 comprises a tubular element 120 that extends along a linear axis between a first end 122 and a second end 124. Four spaced apart lips 128 extends on the internal face of the tubular element each along a portion of the circumference of the tubular element 120. It should be understood that the number of lips 128 may vary. For example, a single lip 128 may extend along the whole circumference of the tubular element 120. The lips 128 form an annular groove or recess 126 which is located adjacent the first end 122 on the internal face 128 of the tubular element 120. In one embodiment, the characteristics of the groove or recess 126 such as its location and its dimensions are chosen so as to receive the lip 88 of the female section 32, 34 when the female section 32, 34 and the connector 36, 38 are connected together. In the same or another embodiment, the characteristics of the grove or recess 126 such as its location and its dimensions are chosen so as to receive the lip 58, 60 of the male section 30 when the male section 30 and the connector 36, 38 are connected together.

The connector 36, 38 further comprises connection means 130 located on the second end 124 for securing the connector 36, 38 to the first or second handrail 14 or 16. It should be understood that any adequate connection means may be used. In the illustrated embodiment, the exemplary connection means 130 comprises a railing interface or hemi-tubular plate 132 and a railing attachment interface or planar plate 134 which each extends outwardly along the linear axis from a wall 136 located at the second end 124 of the connector 36, 38. The hemi-tubular plate 132 and the planar plate 134 are each provided with a hole 138, 140, respectively. The hole 140 of the planar plate 134 is adapted to receive a respective screw when the connection means 130 is inserted into a handrail section 14, 16 in order to fixedly secure 36, 38 within the handrail section 14, 16. The hemi-tubular plate 132 has a curvature that substantially corresponds to that of the internal face of the handrail section 14, 16 and is adapted to slide into a cavity of the handrail section 14, 16 and to be positioned so that it is in physical contact with the internal face of the handrail section 14, 16 when inserted therein. In one embodiment, the hole 138 of the hemi-tubular plate 132 is used for hanging the connector 36, 38 during operations such as painting and/or plating.

In one embodiment, the hole 138 is optional and may be omitted.

It should be understood that the connection means 130 are exemplary only and that any adequate connections for securing the connecting assembly 18 to a handrail section 14, 16 may be used. For example, the connection means may only comprise a tubular plate adapted to snuggingly fit into the handrail section 14, 16. The tubular plate may be secured within the handrail section 14, 16 using adhesive. In another example, the tubular plate and the handrail section 14, 16 may each comprise at least one hole and at least one screw may be used for fixedly securing the tubular plate within the handrail section 14, 16.

Figure 12:
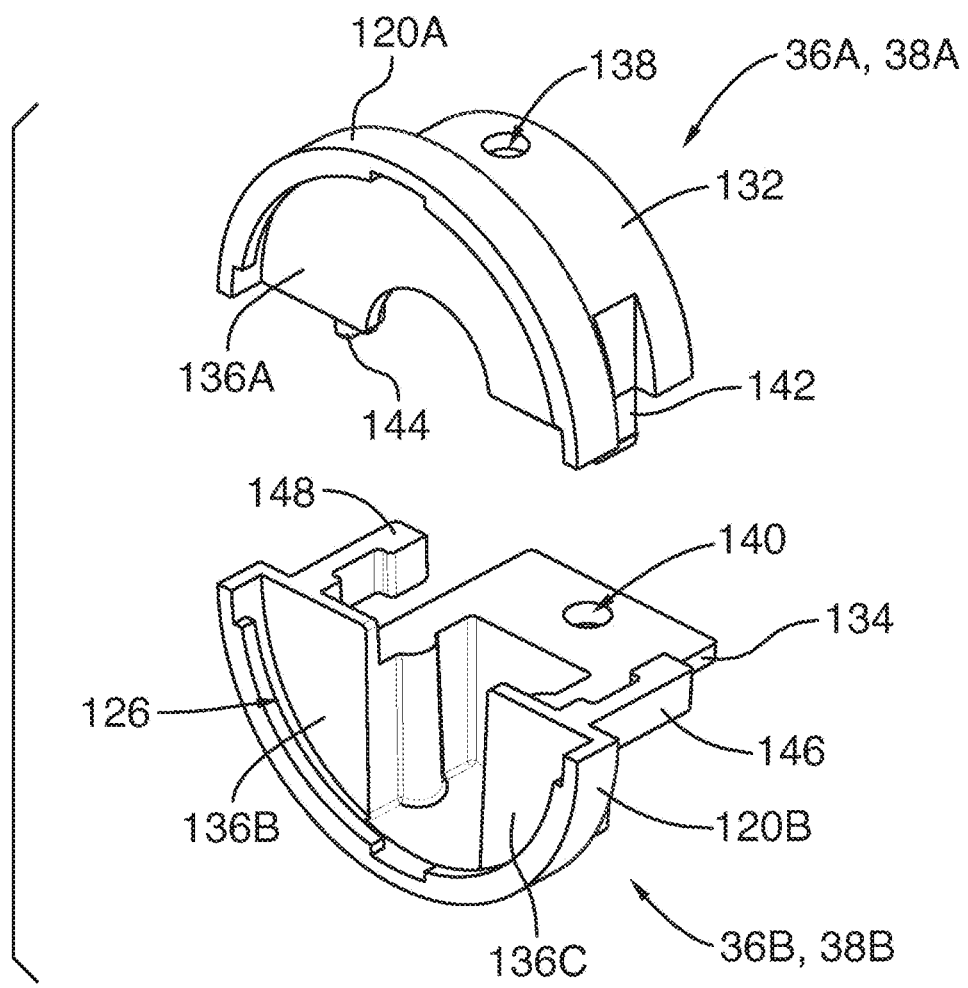
FIG. 12 is a perspective view of two connector elements that form the connector of FIG. 9 when assembled together, in accordance with an embodiment.
Figure 13:
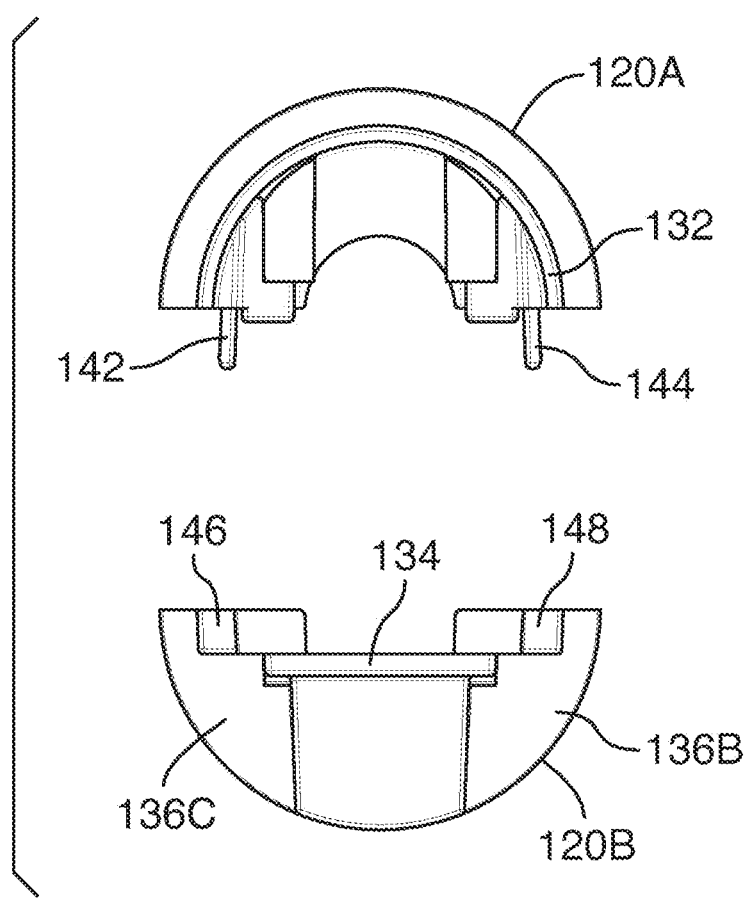
FIG. 13 is a front view of the two connector elements of FIG. 12.

In one embodiment, the connector 36, 38 is made of two hemi-tubular parts 36A, 38A and 36B, 38B which are secured together to form the connector 36, 38, as illustrated in FIGS. 12 and 13. The part 36A, 38A comprises a hemi-tubular element 120A provided with a wall section 136A to which is secured the hemi-tubular plate 132. The hemi-tubular plate 132 extends between two ends which are each provided with a hook 142, 144 that protrudes therefrom. The second hemi-tubular part 36B, 38B comprises wall sections 136B and 136C from which the plate 134 extends. The second hemi-tubular part 36B, 38B further comprises two retaining brackets 146 and 148 which each extend outwardly along the axial direction from a respective wall section 136B, 136C. The retaining brackets 146 and 148 are sized, shaped and positioned so that a respective hook 142, 144 may be secured thereto in order to secure together two hemi-tubular parts 36A, 38A and 36B, 38B.

Figure 14:
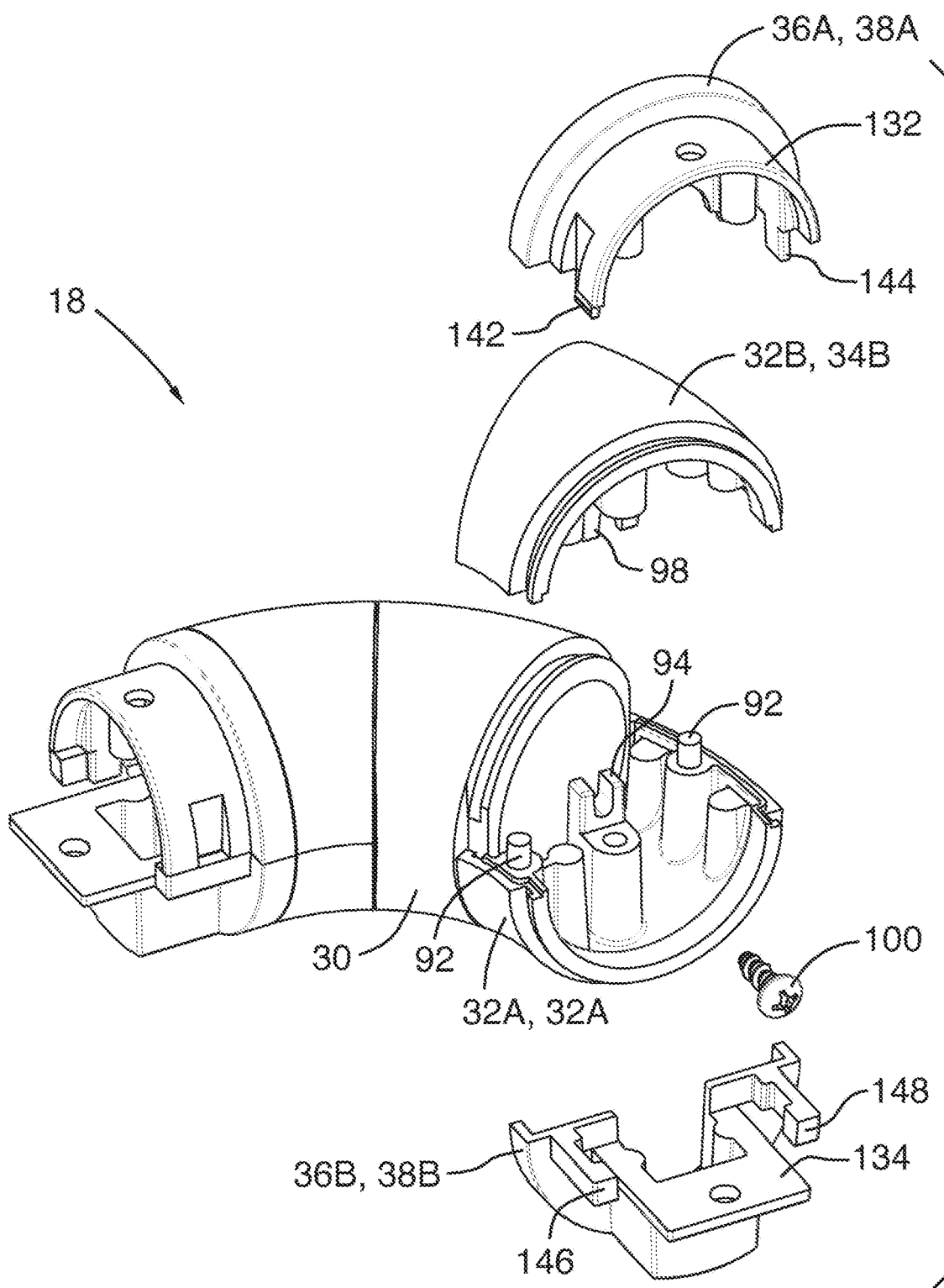
FIG. 14 is an exploded view of the handrail connecting assembly of FIG. 2.

FIG. 14 illustrates one embodiment of a method for assembling together a central male section 30, a female section 32, 34, and a connector 36, 38. The female section 32A, 34A is abutted against the central male section 30 so that the rim 58, 60 of the connecting flange 46, 48 be inserted into the recess 90 of the female section 32A, 34A. Then the second female section 32B, 34B is positioned against the central male section 30 so that the rim 58, 60 of the connecting flange 46, 48 be inserted into the recess 90 of the female section 32B, 34B and the pins 92 be each inserted into their corresponding socket 96. The first and second female sections 32A, 34A and 32B, 34B are then secured together by screwing the screw 100 into the hole formed by the screw receivers 94 and 98. The female section 32, 34 is then rotatably secured to the central male section 33.

Then the connector 36, 38 is secured to the female section 32, 34. The connector section 36B, 38B is abutted against the female section 32, 34 so that the lip 88 of the female section 32, 34 be inserted into the groove 126 of the connector section 36B, 38B. The connector section 36A, 38A is then abutted against the female section 32, 34 so that the lip 88 of the female section 32, 34 be inserted into the groove 126 of the connector section 36A, 38A and the hooks 142 and 144 be secured to their respective bracket 146, 148 via a resilient force. The connector 36, 38 is then rotatably secured to the female section 32, 34.

Figure 15:
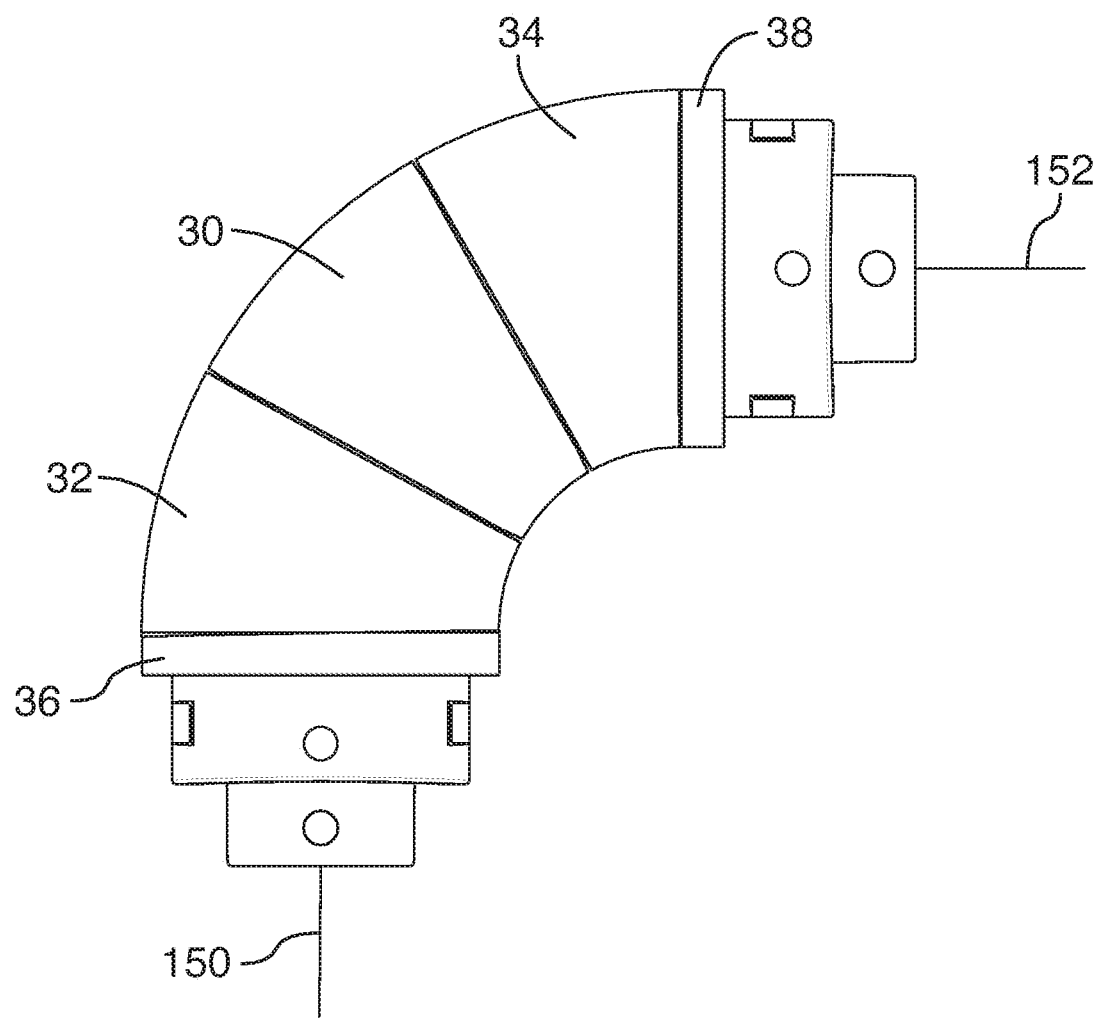
FIG. 15 is top view of a handrail connecting assembly having a curvature of about 90 degrees, in accordance with an embodiment.

FIG. 15 illustrates one configuration for a handrail connecting assembly 18 which comprises a central male section 30, two female sections 32 and 34 each rotatably secured at a respective end of the central male section 30, and two connectors 36 and 38 each rotatably secured to a respective female section 32, 34. The curvature of the central male section is about 30 degrees, i.e. the angle between the axes orthogonal to each end of the central male section 30 is about 30 degrees. Similarly, the curvature of each female section 32, 34 is about 30 degrees, i.e. the angle between the axes orthogonal to each end of the female section 32, 34 is about 30 degrees.

In the configuration illustrated in FIG. 15, the relative position of the male section 30 and the female sections 32 and 34 is chosen so that the shortest length portion of the male section 30 is aligned with the shortest length portions of the female sections 32 and 34. As a result, the curvature of the handrail connecting assembly 18 is about 90 degrees, i.e. the angle formed between a first axis 150 that is orthogonal to the connector 36 and a second axis that is orthogonal to the connector 38.

Figure 16:
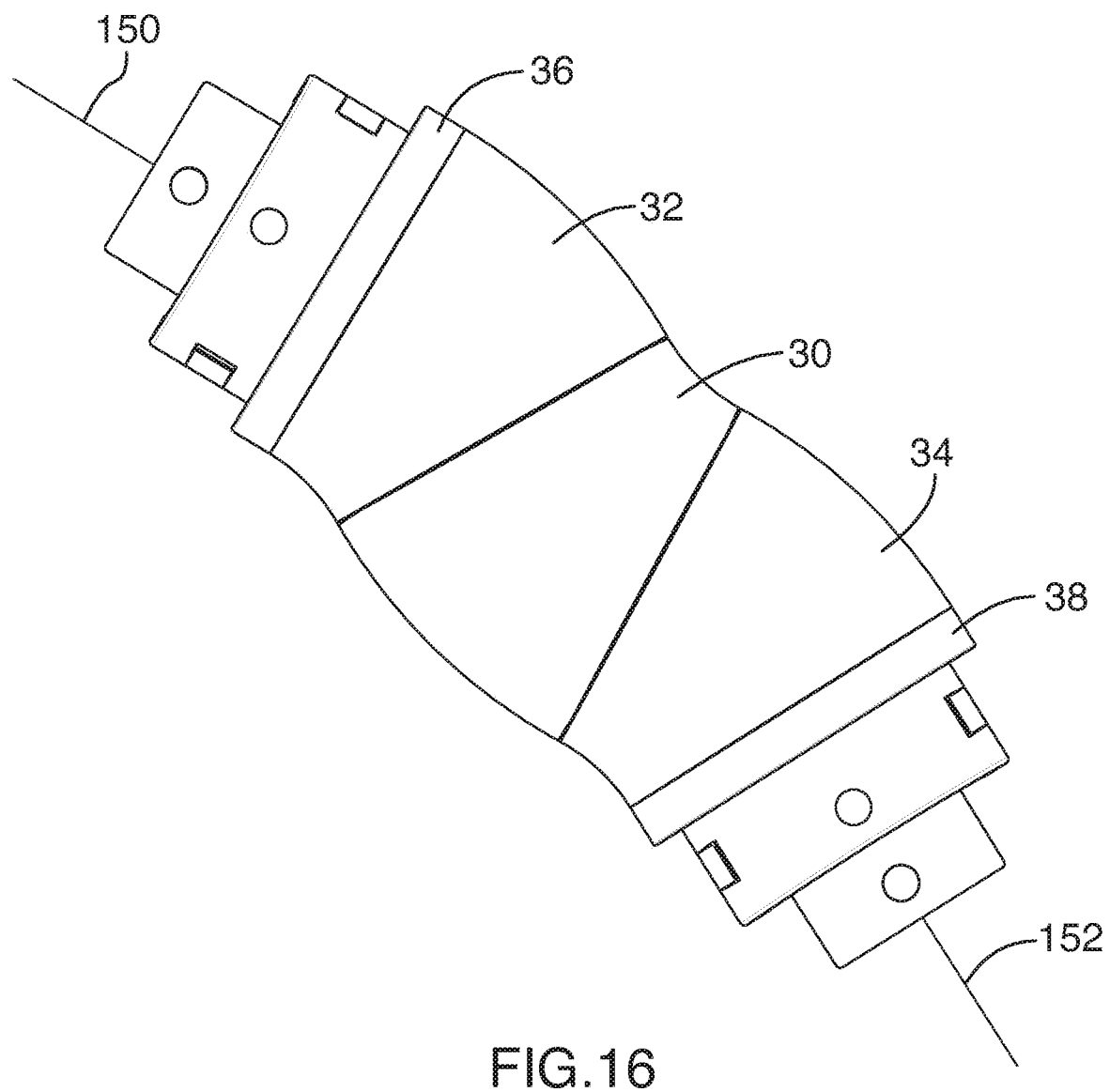
FIG. 16 is a top view of a handrail connecting assembly having a curvature of about 30 degrees, in accordance with an embodiment.

The configuration of the handrail connecting assembly 18 may be changed by rotating at least one female section 32, 34 relative to the male section 30. In the configuration illustrated in FIG. 16, the females sections 32 and 34 are rotated so that their shortest length portions be aligned with the longest length portion of the male section 30. In this configuration, the curvature of the handrail connecting assembly 18 is about 30 degrees.

The person skilled in the art will understand that the curvature of the handrail connecting assembly 18 may then be varied between about 30 degrees and about 90 degrees by rotating at least one female section 32, 34 relative to the central male section 30. The handrail connecting assembly 18 may then be connected to handrail sections 14 and 16 which extend along axes that form an angle comprised between about 30 degrees and about 90 degrees.

In another embodiment, a male section 30 has a curvature of about 32 degrees and a female section 34, 36 has a curvature of about 29 degrees. In this case, the curvature of the handrail connecting assembly 18 comprising a male section and two female sections 34 and 36 may be varied from about 26 degrees and about 90 degrees by rotating the male section 30 and/or at least one of the two female sections 34 and 36.

It should be understood that the curvature of the central section 30 and that of the female sections 32 and 34 may have any adequate values. For example, the curvature of the central section 30 may be different from that of the female sections 32 and 34. In the same or another example, the curvature of the female section 32 may be different from that of the female section 34.

In one embodiment, the connectors 36 and 38 may be omitted. In this case, the female sections 32 and 34 are adapted to be directly secured to a respective handrail section 14, 16. For example, the securing means 130 may be secured to the female section 32, 34 in replacement of the securing flange 76. As described above with respect to the connector 26, 38, the securing means may be replaced by any adequate securing means for securing the connecting assembly 18 to a handrail section 14, 16. For example, the connection means may only comprise a tubular plate adapted to snuggingly fit into the handrail section 14, 16. The tubular plate may be secured within the handrail section 14, 16 using adhesive, screws, and/or the like.

It should also be understood that the handrail connecting assembly 18 may comprise at least one male section 30 and any adequate number of female sections 32, 34 in order to allow varying the curvature of the handrail connecting assembly 18. For example, the connecting assembly may comprise at least a male section and a connector. A first end of the male section is rotatably securable to a first handrail section and the second end of the male section is rotatably securable to a first end of the connector while the second end of the connector is fixedly securable to a second handrail section. It should be understood that the rotatable connection between the first handrail section and the male section may comprise a further connector, a female section, a female section and a further connector, and/or the like.

In another example, the connecting assembly may comprise at least a male section and a female section. A first end of the male section is rotatably securable to a first handrail section and the second end of the male section is rotatably securable to a first end of the female section. It should be understood that the rotatable connection between the first handrail section and the male section may comprise a connector, a further female section, a further female section and a connector, and/or the like. In one embodiment, the second end of the female section is fixedly securable to the second handrail section. In another embodiment, the second end of the female section is rotatably securable to the second handrail section. For example, the rotatable connection between the female section and the second handrail section may comprise a connector, a further female section and a connector, and/or the like.

Figure 17:
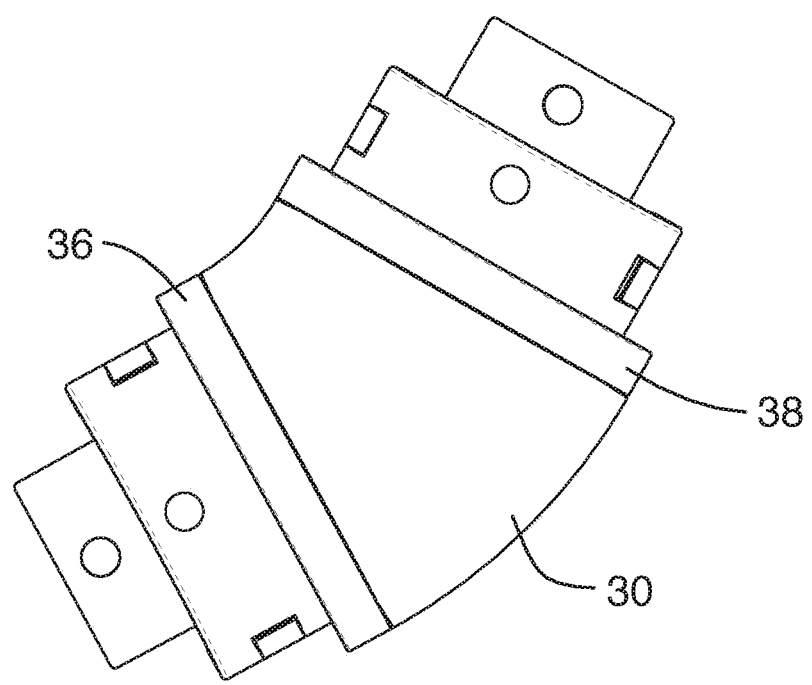
FIG. 17 is a top view of a handrail connecting assembly comprising a male section and two connectors, in accordance with an embodiment.

In one embodiment, the connecting flanges 46 and 48 of the male section 30 and the connecting flange 76 are substantially identical, and the recess 90 of the female section 32, 34 and the groove 126 of the connector 36, 38 are substantially identical in order to provide modularity for the handrail connecting assembly 18. In this case, the male section 30 may be directly connected to a connector 36, 38 as illustrated in FIG. 17. If a curvature of about 30 degrees is required for the handrail connecting assembly 18, then a 30 degree curved male section is connected to two connectors 36 and 38. If a curvature of 60 degrees is required for the handrail connecting assembly 18, a 30 degree curved male section is connected to a connector 36, 38 at one end and to a 30 degree curved female section at the other end, and the 30 degree curved female section is connected to a connector 36, 38.

In one embodiment, the handrail connecting assembly illustrated in FIG. 17 may be used for the top or the bottom of a staircase landing. In an embodiment in which the handrail connecting assembly is to be used at the top of a staircase landing, the curved male section 30 is rotated counterclockwise until its longest length portion is aligned in closest proximity with the hemi-tubular plate 132 of each connector 36, 38. In an embodiment in which the handrail connecting assembly is to be used at the bottom of a staircase landing, the curved male section 30 is rotated clockwise until its shortest length portion is aligned in closest proximity with the hemi-tubular plate 132 of each connector 36, 38. In an embodiment in which a staircase is oriented at 30 degrees, the handrail connecting assembly illustrated in FIG. 17 comprises a 30 degree curved male section 30 and two connectors 36 and 38.

In one embodiment, the external diameter of the male section 30, the female sections 32, 34, and the connectors are substantially the same and equal to the external diameter of the handrail sections 14 and 16. In this case, the external face of the handrail is substantially continuous and smooth.

In one embodiment, a male section 30 has a curvature of about 32 degrees and a female section 34, 36 has a curvature of about 29 degrees. In this case, the curvature of the handrail connecting assembly 18 comprising a male section and two female sections 34 and 36 may be varied from about 26 degrees and about 90 degrees by rotating the male section 30 and/or at least one of the two female sections 34 and 36.

It should be understood that the curvature of the male section and the curvature of the female section may have any adequate value. The value of the curvature of the male section and/or the value of the curvature of the female section(s) is chosen as a function of the angle between the two tubular structures to be connected together.

While the present description refers to a connecting assembly 18 for connecting two handrail sections, the person skilled in the art will understand that the connecting assembly 18 may be adapted for connecting tubes or tubular structures other than handrail sections. The tubular structures to be connected together may be hollow or partially hollow. For example, only one end of a tubular structure may hollow in order to allow the connecting assembly to be inserted into the hollow portion of the tubular structure for attachment purposes while the remaining of the tubular structure is solid. It should be understood that the tubular structure may also be solid along its entire length. For example, the connecting assembly 18 may be adapted to connect together two angled safety railings or railing sections, two angled grab bars or grab bar sections, two angled footrests or foot rest sections, two angled curtain rods or rod sections, and/or the like.

The embodiments of the invention described above are intended to be exemplary only. The scope of the invention is therefore intended to be limited solely by the scope of the appended claims.

I claim:

1. A connecting assembly for connecting two angled tubular structures together, comprising:
   a male section comprising a male curved tubular element extending along a male curved axis between a first end and a second end, a male connecting flange extending linearly and outwardly from the first end and a male connection lip extending radially and outwardly from the male connecting flange, the second end being rotatably connectable to a first one of the two angled tubular structures; and
   a female section rotatably connectable to the male connecting flange of the male section and comprising a female curved tubular element extending along a female curved axis between a third end and a fourth end, the female curved tubular element comprising a lip receiving recess located on an internal face of the female curved tubular element adjacent the third end, the lip receiving recess for receiving the male connection lip when the male connecting flange of the male section is inserted into the female section, the fourth end of the female section being connectable to a second one of the two angled tubular structures.

2. The connecting assembly of claim 1, wherein the female section is rotatably connectable to the second one of the two angled tubular structures.

3. The connecting assembly of claim 1, wherein the female curved tubular element comprises a first curved hemi-tubular element and a second curved hemi-tubular element connectable together to form the female curved tubular element.

4. The connecting assembly of claim 3, further comprising a first screw receiver extending from a first internal face of the first curved hemi-tubular element and a second screw receiver extending from a second internal face of the second curved hemi-tubular element, the first and second screw receivers forming a screw receiving hole when the first and second curved hemi-tubular elements are connected together.

5. The connecting assembly of claim 4, further comprising at least one pin extending from the first internal face of the first curved hemi-tubular element and at least one corresponding socket extending from the second internal face of the second curved hemi-tubular element, the at least one pin being insertable into the at least one corresponding socket when the first and second curved hemi-tubular elements are connected together.

6. The connecting assembly of claim 5, further comprising a rail extending along a longitudinal end of the first curved hemi-tubular element, the second curved hemi-tubular element comprising an indentation extending along a longitudinal end thereof, the rail being insertable into the indentation when the first and second curved hemi-tubular elements are connected together.

7. The connecting assembly of claim 2, wherein the female section further comprises a female connecting flange extending linearly and outwardly from the fourth end and a female connection lip extending radially and outwardly from the female connecting flange, the female connecting flange being connectable to the second one of the two angled tubular structures.

8. The connecting assembly of claim 7, further comprising a connector connectable to the female section and connectable to the second one of the two angled tubular structures, the connector comprising a linear tubular element extending along a linear axis between a first connecting end and a second connecting end and a connection means secured to the first connecting end of the linear tubular element and connectable to the second one of the two angled tubular structures, the linear tubular element comprising a connection recess located on an internal face thereof adjacent the second connecting end and adapted to receive the female connection lip when the female connecting flange of the female section is inserted into the connector.

9. The connecting assembly of claim 8, wherein the connection means comprises a hemi-tubular plate extending linearly and outwardly from the first connecting end of the linear tubular element, the hemi-tubular plate being adapted to be received in the second one of the two angled tubular structures.

10. A connecting assembly for connecting two angled tubular structures together, comprising:
   a pair of end curved tubular elements, each end curved tubular element having a first end connectable one of first and second angled tubular structures and a second end, the end curved tubular element further having an external face extending between the first and second ends, the end curved tubular element extending along an end curved axis such that the external face includes a shortest length portion between the first and second ends and a longest length portion between the first and second ends; and
   a central curved tubular element having a first end rotatably connected to the second end of one of the end curved tubular elements and a second end rotatably connected to the second end of other one of the end curved tubular elements, the central curved tubular element further having an exterior face extending between the first and second ends, the central curved tubular element extending along a central curved axis such that the exterior face includes a shortest length portion between the first and second ends and a longest length portion between the first and second ends, the central curved tubular element being rotatable relative to the end curved tubular elements between a first position in which the longest length portion of the central curved tubular element is aligned with the longest length portion of the end curved tubular elements and a second position in which the longest length portion of the central curved tubular element is aligned with the shortest length portion of the end curved tubular elements.

11. The connecting assembly of claim 10, wherein the central curved tubular element includes a male curved tubular element having a male connecting flange extending linearly and outwardly from the first end and a male connection lip extending radially and outwardly from the male connecting flange, and wherein each end curved tubular element includes a female curved tubular element having a lip receiving recess located on an internal face of the female curved tubular element adjacent the second end thereof, the lip receiving recess for receiving male connection lip when the male connecting flange of the male curved tubular element is inserted into the female curved tubular element.

12. The connecting assembly of claim 11, wherein each female curved tubular element comprises a first curved hemi-tubular element and a second curved hemi-tubular element connectable together to form the female curved tubular element.

13. The connecting assembly of claim 11, wherein each female curved tubular element further comprises a female connecting flange extending linearly and outwardly from the first end of the female curved tubular element and a female connection lip extending radially and outwardly from the female connecting flange, the female connecting flange being connectable to one of the two angled tubular structures.

14. The connecting assembly of claim 13, further comprising first and second connectors, each connector being connectable to a corresponding female curved tubular element and connectable to a corresponding one of the two angled tubular structures, the connector comprising a linear tubular element extending along a linear axis between a first connecting end and a second connecting end and a connection means secured to the first connecting end of the linear tubular element and connectable to the corresponding one of the two angled tubular structures, the linear tubular element comprising a connection recess located on an internal face thereof adjacent the second connecting end and adapted to receive the female connection lip when the female connecting flange of the female curved tubular element is inserted into the connector.

15. A connecting assembly for connecting a first tubular structure to a second tubular structure angled to the first tubular structure, the first tubular structure defining a first longitudinal axis and the second tubular structure defining a second longitudinal axis, the assembly comprising:
   a tubular body having a first end defining a first end axis and the second end defining a second end axis, the first end being connectable to the first tubular structure when the first end axis is aligned with the first longitudinal axis and the second end being connectable to the second angled tubular structure when the second end axis is aligned with the second longitudinal axis, the tubular body including a plurality of curved tubular sections rotatably connected to each other, each curved tubular section including a curved tubular element extending along a curved axis between a first section end defining a first end face and a second section end defining a second end face, the first end face being angled relative to the second end face such that rotation of the curved tubular sections relative to each other changes an angle between the first and second end axes to allow the first and second end axes to be aligned respectively with the first and second longitudinal axes.

16. The connecting assembly of claim 15, wherein the plurality of curved tubular sections includes:
- at least one male curved tubular element, each male curved tubular element having a male connecting flange extending linearly and outwardly from the first section end and a male connection lip extending radially and outwardly from the male connecting flange; and
- at least one female curved tubular element, each female curved tubular element having a lip receiving recess located on an internal face of the female curved tubular element adjacent the second section end thereof, the lip receiving recess for receiving the male connection lip of a corresponding one of the at least one male curved tubular element when the male connecting flange of the male curved tubular element is inserted into the female curved tubular element.

17. The connecting assembly of claim 16, wherein each female curved tubular element comprises a first curved hemi-tubular element and a second curved hemi-tubular element connectable together to form the female curved tubular element.

18. The connecting assembly of claim 16, wherein each female curved tubular element further comprises a female connecting flange extending linearly and outwardly from the first end of the female curved tubular element and a female connection lip extending radially and outwardly from the female connecting flange, the female connecting flange being connectable to one of the two angled tubular structures.

19. The connecting assembly of claim 18, further comprising first and second connectors, each connector being connectable to a corresponding female curved tubular element and connectable to a corresponding one of the first and second tubular structures, the connector comprising a linear tubular element extending along a linear axis between a first connecting end and a second connecting end and a connection means secured to the first connecting end of the linear tubular element and connectable to the corresponding one of the first and second tubular structures, the linear tubular element comprising a connection recess located on an internal face thereof adjacent the second connecting end and adapted to receive the female connection lip when the female connecting flange of the female curved tubular element is inserted into the connector.

* * * * *